United States Patent [19]

Mahmood

[11] 4,271,521

[45] Jun. 2, 1981

[54] ADDRESS PARITY CHECK SYSTEM

[75] Inventor: Kamal A. Mahmood, El Paso, Tex.

[73] Assignee: The Anaconda Company, Greenwich, Conn.

[21] Appl. No.: 55,631

[22] Filed: Jul. 9, 1979

[51] Int. Cl.³ .............................................. G06F 11/10
[52] U.S. Cl. ....................................................... 371/51
[58] Field of Search ........................ 371/21, 22, 49, 51

[56] References Cited

U.S. PATENT DOCUMENTS

| 3,585,378 | 5/1971 | Bouricius et al. | 371/51 |
| 3,599,146 | 8/1971 | Weisbecker | 371/51 |
| 3,789,204 | 1/1974 | Barlow | 371/51 |
| 3,914,741 | 10/1975 | Bonser et al. | 371/49 |
| 3,992,696 | 11/1976 | Fergeson | 371/51 |
| 4,020,459 | 4/1977 | Coomer | 371/51 |

Primary Examiner—Jerry Smith
Attorney, Agent, or Firm—Hubbard, Thurman, Turner, Tucker & Glaser

[57] ABSTRACT

Apparatus and method for detecting errors in addressing as well as transfer and storage of data. Both odd and even parity are alternately assigned to data words as a function of the memory address where a particular data word is stored. A parity error on reading occurs when either an error has occurred in the data word itself or when the memory has been incorrectly addressed.

5 Claims, 4 Drawing Figures

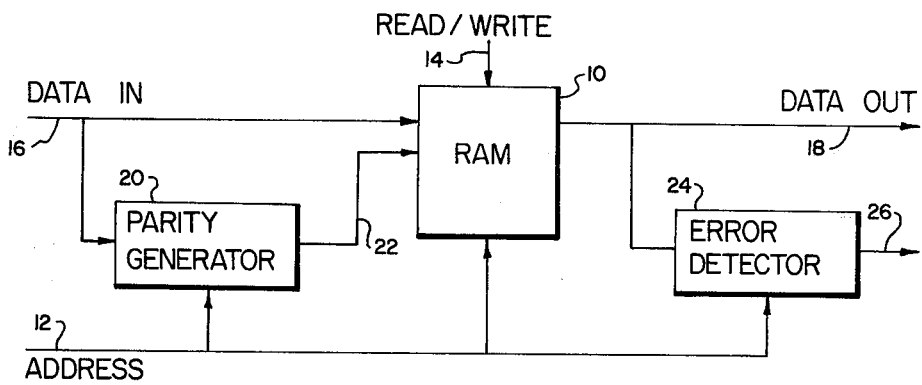
FIG. 1
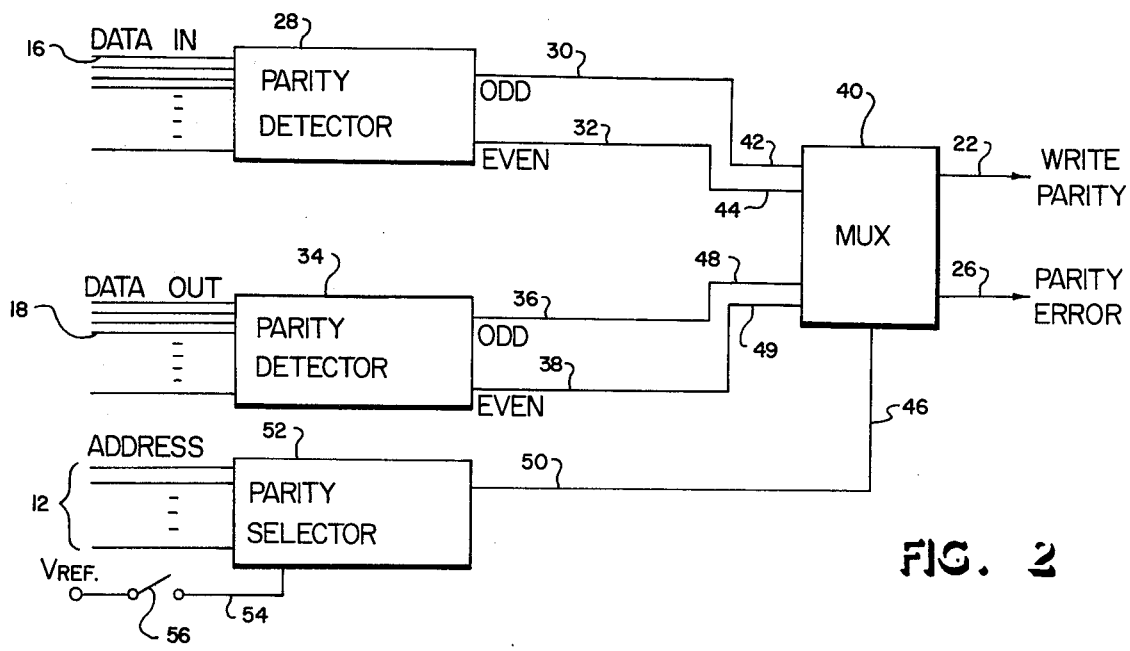
FIG. 2
| BINARY ADDRESS | P |
|---|---|
| 000 | 0 |
| 001 | 1 |
| 010 | 1 |
| 011 | 0 |
| 100 | 1 |
| 101 | 0 |
| 110 | 0 |
| 111 | 1 |
FIG. 3
| GRAY CODE ADDRESS | P |
|---|---|
| 000 | 0 |
| 001 | 1 |
| 011 | 0 |
| 010 | 1 |
| 110 | 0 |
| 111 | 1 |
| 101 | 0 |
| 100 | 1 |
FIG. 4

ADDRESS PARITY CHECK SYSTEM

BACKGROUND OF THE INVENTION

The present invention relates to the transfer or storage of digital data having assigned addresses and more particularly to parity assignment according to data address.

The concept of parity assignment for the purpose of detecting errors in the transfer of digital data is well known. A digital data word comprises generally a sequence of zeros and ones. When the number of ones in a data word is an odd number the word has odd parity and when it is an even number the word has even parity. An additional bit is often added to a data word as a parity bit to aid in detection of errors in the particular word. The parity bit is either a zero or a one dependent upon which is required to make the complete word, including data and parity bit, have the appropriate parity selected for the system. Thus odd parity may be selected for a system. In such a case, for example, the digital word 010 would have a parity bit of "0" since the word by itself has odd parity. In the same system the digital word 110 would have a parity bit of "1" in order to make the complete word, including data and parity bit, have an overall odd parity.

The above described odd parity system is used to detect errors in data transfer as follows. Upon receiving a word transferred with odd parity or stored with odd parity, the parity of the overall word is again checked. If the parity is still odd it is presumed that no errors occurred in the word. If on the other hand, any one of the bits in either the data word itself or the parity bit has been changed from either a one to a zero or a zero to a one the overall parity will be even when checked. The even parity indication is an error indication and signals the need to take appropriate corrective action. In a similar manner even parity may be used for a system so that the occurrence of an odd parity word indicates an error.

In digital data storage systems such as random access memories, data is received and written into the memory at a selected address location. Data is then read from the memory for later use by addressing this same location to recall the stored information. The parity system described above is normally used upon writing into the memory and reading from the memory to determine if an error has been made in one of these operations. But, there is a chance a similar type error occurs in addressing the memory either for writing data in or reading data from the memory. The memory addresses are usually digital words and errors can occur in which one or more bits of the digital address is inverted. If upon reading from the memory an address error occurs it is very likely that the data read from the memory will have correct parity even though the data is totally erroneous since it is read from the wrong memory location. In similar fashion an address error upon writing can cause data words having correct parity to be written into an erroneous address location and to be effectively lost.

SUMMARY OF THE INVENTION

Accordingly an object of the present invention is to provide improved apparatus for detecting error in the storage or transfer of digital data.

Another object of the present invention is to provide apparatus for detecting errors in both the addressing and transfer or storage of digital data words.

Yet another object of the present invention is to provide a method for detecting errors occurring in both the addressing and storage or transfer of digital data.

These and other objects are achieved by providing a system including means for assigning odd and even parity alternately to digital data words as a function of address location for transfer or storage of digital data. The method of the present invention includes the detection of parity of data words which are to be stored or transmitted with an identifying address; the generation of a parity bit for the data word as a function of a parity assigned to the particular address and the parity of the word; and, upon receiving a transmitted word or recalling a stored word from memory, comparing the parity of the stored data word and parity bit with the parity assigned to the address identifying the data word.

BRIEF DESCRIPTION OF THE DRAWINGS

The present invention may be better understood by reading the following detailed description of the preferred embodiments with reference to the accompanying drawings wherein:

FIG. 1 is a general block diagram illustrating the flow of data into and from a storage device;

FIG. 2 is a block diagram of a parity generator and error detector according to the present invention; and FIGS. 3 and 4 are simplified tables of parity assignment by memory address.

DESCRIPTION OF THE PREFERRED EMBODIMENT

With reference now to FIG. 1 there is shown a general block diagram of data transfer to and from a storage element with error detection equipment according to the present invention. In FIG. 1 a storage element 10 may be a random access memory which can store a number of digital data words at selected locations each identified by addresses received on an address line 12. Such memories typically have a read or write input 14 for determining whether the memory 10 writes incoming data into memory or reads stored data from the memory. A data input line 16 is provided for receiving incoming data and a data output line 18 is provided for transferring stored data out. It will be appreciated that lines 16 and 18 each represent a plurality of lines equal to the number of bits per word stored in the memory 10. Most memories provide only a single set of lines in the form of a bus for both writing data into memory and reading it from the memory to lower the total pin count of the device.

As discussed above, a parity bit is usually written into memory along with the data stored therein as an error checking method. In the present invention a parity generator 20 is provided having inputs connected to data input line 16 and to address line 12 and an output line 22 connected to an input of memory 10. Generally stated the function of parity generator 20 is to provide a parity bit on line 22 for each data word received on line 16 with overall parity selected as a function of the address received on line 12. The present invention also includes an error detector 24 for checking the parity of data read out on line 18. Detector 24 provides a signal on an error output line 26 to indicate whether parity of the output data is correct or in error. Generally stated detector 24 determines the parity of the output word on line 18 which includes both data and a parity bit and compares this overall parity to that assigned to the address location which the detector 24 receives on line 12. The functions of parity generator 20 and error detector 24 are explained in more detail below with reference to FIG. 2.

With reference now to FIG. 2, there is illustrated in block diagram form the parity generating and error detection apparatus of the present invention. The data input line 16 from FIG. 1 is illustrated as a plurality of input lines, one for each bit, connected to a parity detector 28. Detector 28 provides odd and even parity indications on outputs 30 and 32 respectively. In similar fashion data output line 18 is indicated at a plurality of inputs to a second parity detector 34 which provides odd and even parity indications on outputs 36 and 38. Detectors 28 and 34 are preferably commercial parity detectors such as those sold with the part number 74LS280 by Texas Instruments, Inc. In the preferred embodiment the detectors 28 and 34 comprise three of these devices interconnected to detect the parity of data words up to twenty-five bits in length.

The outputs of parity detectors 28 and 34 are connected to inputs of a multiplexer 40. Multiplexer inputs 42 and 44 receive the outputs 30 and 32 respectively of detector 28. The inputs 42 and 44 are alternately connected to the write parity line 22 under the control of an input received on a line 46. In similar fashion inputs 48 and 49 receive outputs 36 and 38 respectively of detector 34. These inputs 48 and 49 are alternately connected to the parity error line 26.

The multiplexer control line input 46 is connected to an output 50 of a parity selector 52. Parity selector 52 receives the address inputs on line 12 and additionally receives an override signal on a line 54. Generally stated parity selector 52 provides a single bit, that is a "1" or a "0", on output 50 indicating odd or even parity as a function of the address received on inputs 12. This single bit indicating parity is coupled to input 46 of multiplexer 40 to select the appropriate inputs which are connected to the output lines 22 and 26. While the FIG. 1 diagram indicates that parity generator 20 and error detector 24 may each have its own separate but identical parity selector, the FIG. 2 embodiment illustrates that a single parity selector 52 may be used both for writing and reading of data from the memory.

Parity selector 52 may comprise a number of different elements. In the preferred embodiment, selector 52 is a read only memory permanently programmed to provide parity indications on output line 50 for each of the possible addresses coupled to input 12. In this preferred embodiment the selection of parities for each address was actually made randomly. This random selection was found to be suitable for the particular problem which was encountered in digital geophysical systems in which the memory element 10 was a magnetic tape. In this system it was found that the most common error was a total loss of signal so that the data being read from tape was merely random "1's" and "0's". In this extreme case it was determined that the random selection of parity assignments provides a fifty percent probability of detecting the total loss of signal for each data word. Since such total loss usually affects a sequence of words the net result is a reliable error indication.

For the more general case it is anticipated that the assignment of parities stored in selector 52 should be such as will provide alternate odd and even parities for addresses which differ by a single digital bit. The table provided in FIG. 3 illustrates a simple example of three bit binary addresses and the parity assigned to each of the eight possible addresses to achieve this goal. The "0" in the parity column indicates even parity while the "1" indicates odd parity. Study of the addresses in FIG. 3 show that if any single bit in any address is changed from a "1" to a "0" or a "0" to a "1", the corresponding parity indication will also be changed. It will be apparent that the assignment of parities can be made alternately if the binary addresses are arranged in Gray code as provided in FIG. 4. Gray code is, by definition, an arrangement of binary numbers so that each number differs from the preceding and following numbers in only one place. As a result, when the addresses are arranged in Gray code, the parity indicators alternate from odd to even as set out in FIG. 4.

Another feature becomes apparent from study of FIGS. 3 and 4. The parity assignments provided for the binary addresses correspond to the parity of the addresses themselves. That is, the binary addresses which have been assigned odd parity as indicated by a "1" in the "P" column each have an odd number of "1's" which by definition is odd parity.

The parity assignments illustrated in FIGS. 3 and 4 may be directly programmed into a read only memory to function as parity selector 52. But since the resulting parity assignments also correspond to the parities of the addresses, a parity detector such as those used for detectors 28 and 34 may be used as the parity selector 52. In this way initial programming of a read only memory may be avoided and the assigned parity may be determined each time the memory is addressed.

The input 54 to parity selector 52, discussed briefly above, is intended for use only as a diagnostic tool. In particular, if large numbers of parity errors are occurring in a system, it becomes important to determine whether the errors are occurring in the addressing or in the actual data transfer. Connection of a reference voltage to input 54, by means of a manual switch 56, forces a constant parity indicator on output 50 of selector 52. If data is then written into memory and read back from memory and error indications still occur it can be presumed that the errors occur in the data transfer itself rather than the addressing. If on the other hand the errors are no longer detected then it can be presumed that the errors have been occurring in the addressing system.

With reference now to FIGS. 1 and 2, operation of the present system will be described. When a multi-bit data word is received on line 16, the digital system assigns a memory location for storage of the word by applyng an address to line 12. Parity detector 28 determines the actual parity of the new data word and provides a "1" on output line 30 if the parity is odd or otherwise provides a "1" on line 32 if the parity is even. Only one of output lines 30 and 32 can be "1" at any given time. Simultaneously parity selector 52 receives the address on line 12 and provides a parity indicator, as previously assigned, to that address on output 50. As an example, if parity selector 52 provides a "1" on output 50 indicating odd parity, this "1" is coupled to input 46 to cause multiplexer 40 to connect its input 44 to the write parity line 22. With this arrangement the even parity output 32 of the detector 28 is connected to the write parity line 22. Thus, if the data in has even parity as indicated by a "1" on output 32 the write parity output 22 will also be a "1" causing a "1" to be written into the parity bit location in memory 10. The overall word including the input data and the parity bit will then have odd parity as selected by selector 52. If on the other hand, the input data word had odd parity as indicated by "1" on output 30 and a "0" on output 32, the "0" will be coupled to write parity line 22 and the overall word written into memory 10 will again have odd parity. In similar fashion if, at another address, parity selector 52 calls for even parity at output 50, the multiplexer 40 will connect input 42 to write parity line 22. With this connection odd parity data in will cause a "1" to be coupled from detector output 30 to write parity line 22 with the result that the overall word written into memory 10 will have even parity. Finally, if the input data has even parity a "0" would appear on write parity line 22 and the overall word again would have even parity when written in memory 10.

Detection of errors occurs upon reading data from memory 10. Upon a read cycle the data read from memory 10 is coupled to the data output lines 18 and includes the one stored parity bit. The memory 10 must be addressed to read out a stored or data word and selector 52 also receives this address to provide the assigned parity indicator on output 50 in the same manner as it did upon writing into memory. Parity detector 34 receives the complete data plus parity bit word and indicates the overall parity of this word on its output lines 36 and 38. When selector 52 is calling for odd parity it couples a "1" to the selector input 46 of multiplexer 40. This "1" on input 46 causes input 49 to be coupled to parity error output 26. If the data being read does in fact have odd parity a "0" appears on output 38 which is coupled to input 49 of the multiplexer 40 so that the parity error line 26 is also "0" indicating no error. If on the other hand the data word being read is of even parity a "1" will be coupled to output 26 indicating an error. In similar fashion if parity selector 52 provides a "0" on output 50 indicating even parity, multiplexer 40 connects the odd parity output 36 to the parity error indicator line 26. If the data being read out is of even parity the error line will again have a "0" indicating no error but if the data is odd parity line 26 will be a "1" indicating error.

Parity errors indicated on line 26 may be used in any conventional manner. For example an error indication may cause an alarm to sound and thereby notify an operator or it may be used to halt the operation of, for example, a tape drive from which stored data is being read.

While the present invention is particularly directed to storage of data in a memory such as a random access memory or a magnetic tape it is apparent that the error detection equipment may be employed in other systems as well. For example, in some digital data transmission systems each data word is identified by an address in a manner similar to the random access memory arrangement. In such a case that address or any other data identifying word may be used as a source for generating a parity indicator. The parity indicator would then be used to generate a parity bit which would be transmitted to use along with the data and the address for error detection. Upon receipt of the data, the parity bit, and the address, the parity indicator would be reconstructed from the address. The parity of the data plus the parity bit could then be checked to determine if an error in either the address or data had occurred.

While the present invention has been illustrated and described with reference to particular apparatus and methods of use it is apparent that various modifications can be made within the scope of the present invention as defined by the appended claims.

I claim:

1. A method for detecting errors occurring in the process of writing data words into selected memory locations and reading data from said memory locations comprising;
    assigning a parity to each memory location as a function of memory address,
    receiving a data word for storing in a preselected memory location,
    generating a parity bit for said data word as a function of the parity of said data word and the parity assigned to the preselected memory location,
    storing said data word and said parity bit in said preselected memory location,
    reading said data word and parity bit stored in said preselected memory location,
    detecting the parity of said data word and parity bit, and
    comparing the detected parity to the parity assigned to said memory location to determine if an error has been made in either addressing said location or in transferring data.

2. A method according to claim 1 wherein odd and even parity are randomly assigned to each memory location.

3. A method according to claim 1 wherein odd and even parity are alternately assigned to said memory locations according to Gray code sequence of addresses.

4. A method according to claim 1 wherein odd and even parity are assigned to said memory locations as a function of the parity of the memory address identifying each memory location.

5. In a digital data storage system of the type in which data words are stored in memory locations each having a unique address, improved error detecting apparatus comprising:
    a first parity detector (28) having inputs (16) for receiving a data word and an output (30, 32) for providing an indication of the parity of said received data word;
    a parity selector (52) having an input (12) for receiving an address selected for storage of said received data word and an output (50) for providing in response to said address an indication of parity to be applied to the received data word;
    a parity bit generator (20) having inputs connected to the outputs of the first parity detector (28) and said parity selector (52) and an output (22) for providing a parity bit to be stored with said received data word;
    a second parity detector (34) having inputs (18) for receiving a data word and a parity bit stored at the address of the data word and an output (36, 38) for providing an indication of the parity of said data word and parity bit; and,
    parity error indicating means (40) having an input (46, 48, 49) connected to the outputs of said parity selector (52) and said second parity detector (34) and an output (26) for providing an error indication when said inputs are not the same.

* * * * *